United States Patent
Oikawa

(10) Patent No.: US 8,985,608 B2
(45) Date of Patent: Mar. 24, 2015

(54) FRAME STRUCTURE FOR SADDLE-RIDDEN-TYPE VEHICLE

(71) Applicant: Suzuki Motor Corporation, Hamamatsu-shi, Shizuoka (JP)

(72) Inventor: Shuichi Oikawa, Hamamatsu (JP)

(73) Assignee: Suzuki Motor Corporation, Hamamatsu-Shi (JP)

(*) Notice: Subject to any disclaimer, the term of this patent is extended or adjusted under 35 U.S.C. 154(b) by 0 days.

(21) Appl. No.: 14/206,844

(22) Filed: Mar. 12, 2014

(65) Prior Publication Data
US 2014/0265230 A1    Sep. 18, 2014

(30) Foreign Application Priority Data
Mar. 14, 2013    (JP) .................. 2013-052010

(51) Int. Cl.
*B62K 11/04* (2006.01)
*B62K 19/20* (2006.01)

(52) U.S. Cl.
CPC ............... *B62K 11/04* (2013.01); *B62K 19/20* (2013.01)
USPC ..................................................... 280/281.1

(58) Field of Classification Search
CPC ......... B62K 19/18; B62K 19/20; B62K 19/28
See application file for complete search history.

(56) References Cited

U.S. PATENT DOCUMENTS

| | | | | |
|---|---|---|---|---|
| 4,699,233 A * | 10/1987 | Koga et al. | ..................... | 180/219 |
| 5,423,564 A * | 6/1995 | Harvey | ..................... | 280/281.1 |
| 7,331,322 B2 * | 2/2008 | Seki et al. | ............... | 123/184.21 |
| 7,490,689 B2 * | 2/2009 | Seki et al. | ..................... | 180/229 |
| 8,684,388 B1 * | 4/2014 | Teixeira | ..................... | 280/281.1 |
| 2005/0247500 A1 * | 11/2005 | Miyamoto | ..................... | 180/219 |
| 2012/0038129 A1 * | 2/2012 | D'Aluisio et al. | ......... | 280/281.1 |
| 2013/0154311 A1 * | 6/2013 | Keisuke et al. | ............... | 296/205 |

FOREIGN PATENT DOCUMENTS

JP    A-S62-34879    2/1987

* cited by examiner

*Primary Examiner* — Tony Winner
(74) *Attorney, Agent, or Firm* — Stein IP, LLC

(57) ABSTRACT

There is provided a frame structure for a saddle-ridden type vehicle. A pair of tank rails are jointed to a head frame and extend rearward of a vehicle body from the head frame. The head frame includes a head pipe portion and a pair of arm portions being continuous with the head pipe portion and extending rearward of the vehicle body. Each of upper surfaces of at least one of rear end portions of the arm portions and front end portions of the tank rails are formed into a convex surface having an arc-shaped cross section. The rear end portions of the arm portions and the front end portions of the tank rails are respectively welded to each other so that end portions of weld beads are positioned at side surfaces thereof.

3 Claims, 7 Drawing Sheets

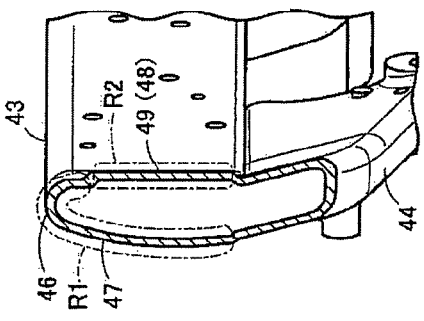
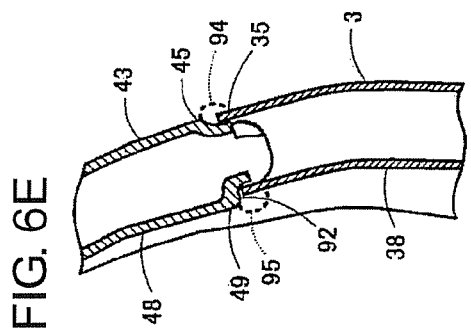
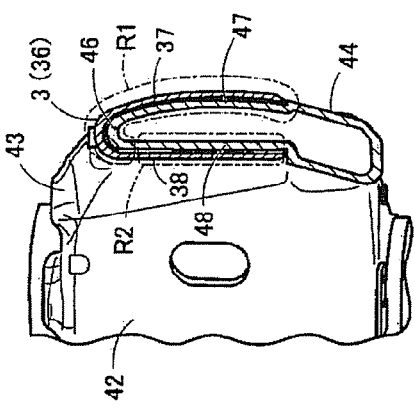
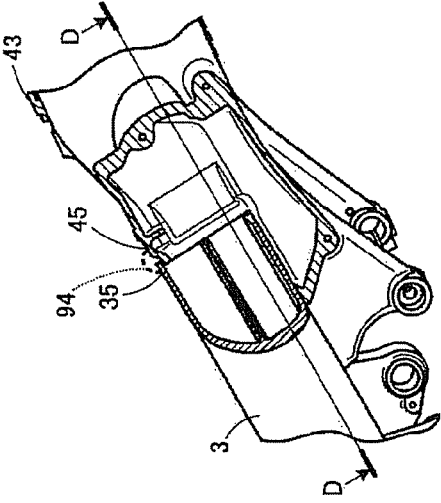
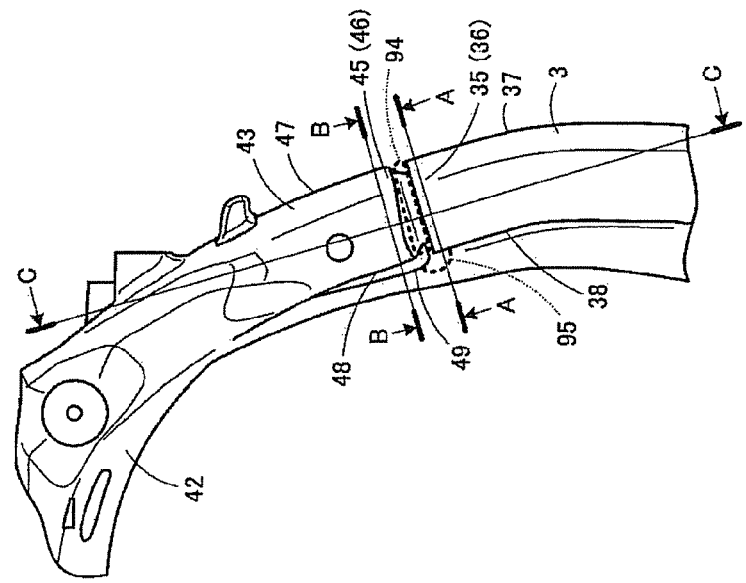

FRAME STRUCTURE FOR SADDLE-RIDDEN-TYPE VEHICLE

CROSS-REFERENCE TO RELATED APPLICATIONS

This application claims the benefit of Japanese Application No. 2013-052010, filed Mar. 14, 2013, in the Japanese Patent Office. All disclosures of the document(s) named above are incorporated herein by reference.

BACKGROUND OF THE INVENTION

1. Field of the Invention

The present invention relates to a frame structure for a saddle-ridden-type vehicle such as a motorcycle, and more specifically, to a frame structure of an aluminum twin spar frame.

2. Description of the Related Art

In a related-art frame structure for a motorcycle, a front end portion of each tank rail is welded to a head frame having a head pipe. In the head frame disclosed in Patent Document 1, a rectangular-tube-shaped joint portion protrudes from a side surface of a head pipe, and a front end portion of a rectangular-tube-shaped tank rail is fitted with the joint portion in an overlap manner. The joint portion of the head frame and the front end portion of the tank rail are subjected to fillet welding over whole circumference thereof, to improve joint strength between the head frame and the tank rail.

Patent Document 1: Japanese Patent Application Publication No. S62-034879A

In the motorcycle, however, a bending load is applied to the welded portion between the head frame and the tank rail due to push-up from a road surface or a brake force of a brake. In this instance, stress concentration is easily produced on an upper surface side of the welded portion between the head frame and the tank rail. Further, in the frame structure disclosed in Patent Document 1, since the joint portion of the head frame and the front end portion of the tank rail are formed in the rectangular-tube-shape, it is not possible to continuously weld them over a corner portion having a high curvature. For this reason, an end portion of a weld bead is formed at a corner portion of the upper surface side of the welded portion, and thus a load is likely to be applied to the welded portion.

SUMMARY OF THE INVENTION

It is therefore an object of the present invention to provide a frame structure for a saddle-ridden type vehicle which can suppress a load in welded portions between a head frame and tank rails.

In order to achieve the above object, according to an aspect of the embodiments of the present invention, there is provided a frame structure for a saddle-ridden type vehicle, comprising a head frame positioned at a front portion of a vehicle body; and a pair of right and left tank rails jointed to the head frame, the pair of right and left tank rails extending rearward of the vehicle body from the head frame, wherein the head frame includes a head pipe portion supporting a front-wheel suspension portion, and a pair of right and left arm portions being continuous with the head pipe portion and extending rearward of the vehicle body, wherein each of upper surfaces-of at least one of rear end portions of the pair of right and left arm portions and front end portions of the pair of right and left tank rails are formed into a convex surface having an arc-shaped cross section, and wherein the rear end portions of the pair of right and left arm portions and the front end portions of the pair of right and left tank rails are respectively welded to each other so that end portions of weld beads are positioned at side surfaces thereof.

With this configuration, the joint portions between the head frame and the tank rails are formed into the smooth curved surfaces from the upper surfaces to the side surfaces. For this reason, the welding crossing the upper surfaces can be extended to the side surfaces, and thus the end portions of the weld beads are positioned at the side surfaces. Accordingly, the end portions of the weld beads are not positioned at the upper surfaces, on which the stress is likely to concentrate, but is positioned at the side surfaces, on which the stress is hardly to concentrate, thereby suppressing the load in the welded portion. In addition, as compared with a configuration in which a corner portion exists between the upper surface and the side surface, it is possible to move a welding torch with a margin, without abruptly changing an angle of the welding torch, so that the welding operation can be easily performed.

Further, in the frame structure for the saddle-ridden type vehicle, inner surfaces of the pair of right and left arm portions may be provided with convex portions to form stepped portions at joint portions between the rear end portions of the pair of right and left arm portions and the front end portions of the pair of right and left tank rails, and the convex portions of the pair of right and left arm portions and the rear end portions of the pair of right and left arm portions may be respectively welded to each other by fillet welding. With this configuration, in a case where a gap between the pair of right and left tank rails is narrow and thus it is not possible to perform butt welding on the joint portions with the welding torch being directed vertical to the joint portions, the fillet welding can be performed by inclining the welding torch at an angle. Further, it is possible to perform the welding in a stable state with the front end portions of the tank rails abutting against the convex portions of the arm portions. Therefore, it is possible to improve precision of the frame and to maintain a quality of the welding.

Furthermore, in the frame structure for the saddle-ridden type vehicle, the rear end portions of the pair of right and left arm portions and the front end portions of the pair of right and left tank rails may be respectively welded to each other by butt welding so that the end portions of the weld beads are positioned at the inner surfaces, and are respectively welded so as to be continuous with the end portions of the weld beads by the fillet welding. With this configuration, since the end portions of the weld beads by the butt welding and the end portions of the weld beads by the fillet welding are close to each other to be continuous with each other, it is possible to suppress the load in the end portions of the weld beads.

According to the frame structure for the saddle-ridden type vehicle, it is possible to suppress the load in the welded portions between the head frame and the tank rails by continuously welding the joint portions between the head frame and the tank rails from the upper surfaces to the side surfaces.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 6A to 6E are views illustrating a welded portion between a head frame and tank rails according to the embodiment, where FIG. 6A is a plan view of a portion near the welded portion, FIG. 6B is a cross-sectional view taken along the line A-A in FIG. 6A, FIG. 6C is a cross-sectional view taken along the line B-B in FIG. 6A, FIG. 6D is a cross-sectional view taken along the line C-C in FIG. 6A, and FIG. 6E is a cross-sectional view taken along the line D-D in FIG. 6D; FIG. 7A is an explanatory view of the butt welding when seen in a cross sectional view, FIG. 7B is an explanatory view of the butt welding when seen in a plan view, and FIG. 7C is an explanatory view of the fillet welding when seen in a plan view.

DETAILED DESCRIPTION OF THE EMBODIMENTS

Now, an embodiment will be described in detail with reference to the accompanying drawings. Although an example in which a frame structure according to the present invention is applied to an aluminum twin spar frame will be described hereinafter, the application is not limited to the frame, but may be changed. Also, although an example in which the frame structure according to the present invention is applied to a motorcycle of a tourer type, it may be applied to motorcycles of other types or a four-wheel all-terrain vehicle for irregular ground.

Figure 1:
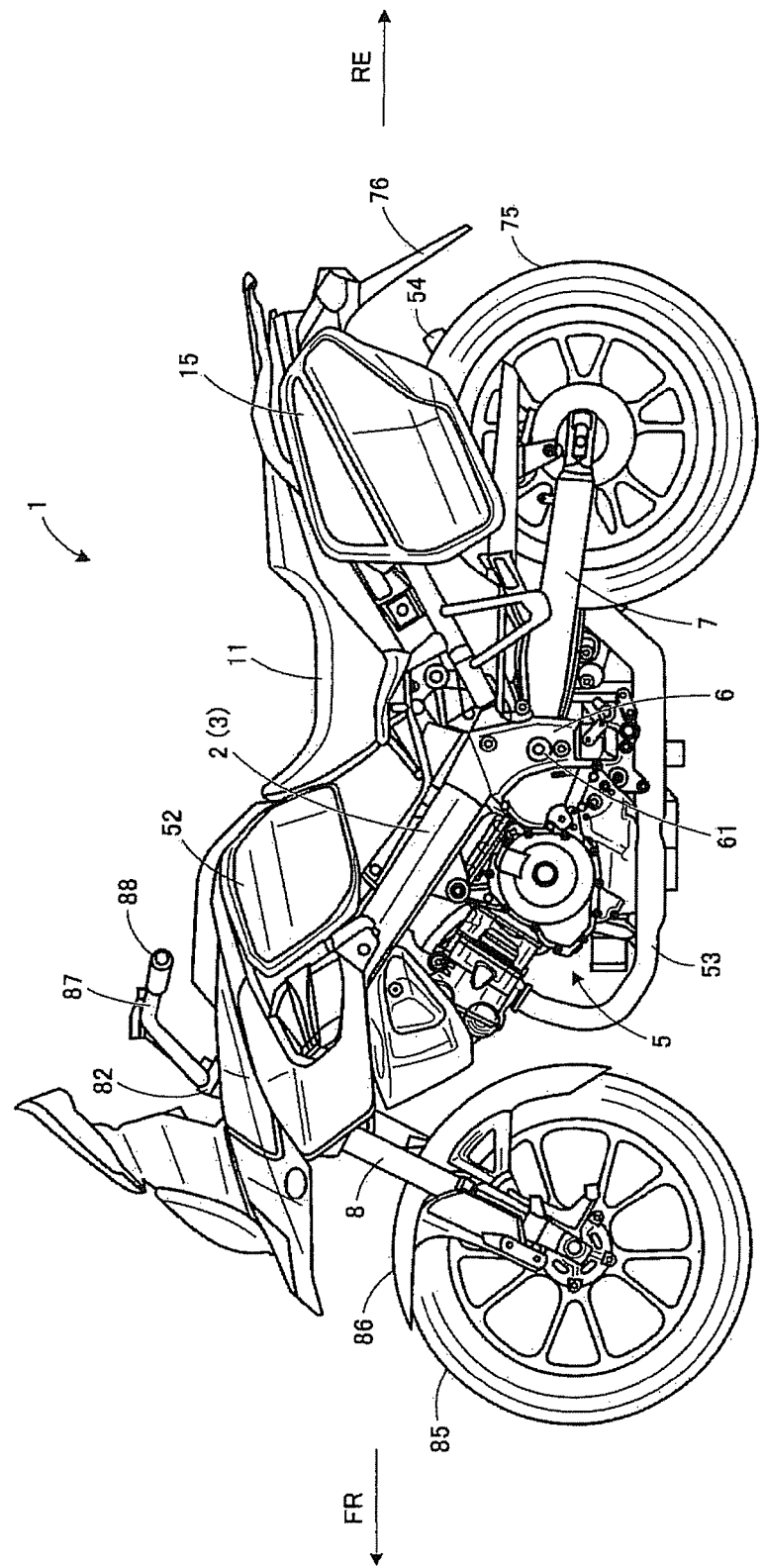
FIG. 1 is a left side view of a motorcycle according to an embodiment of the present invention.
Figure 2:
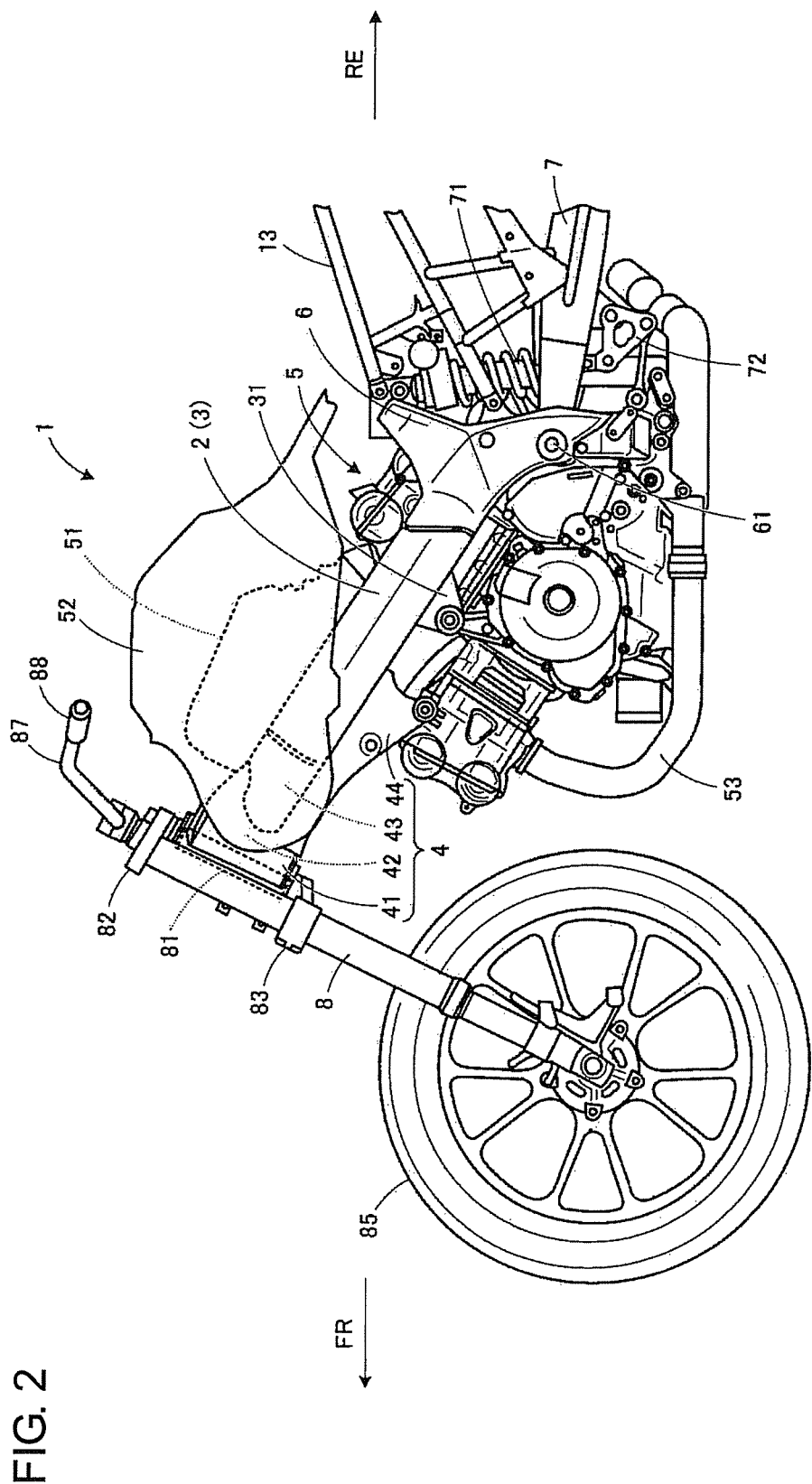
FIG. 2 is a left side view of the motorcycle according to the embodiment, in which an external member is detached from a vehicle body frame.

The overall configuration of a motorcycle according to the embodiment will be described with reference to FIG. 1. FIG. 1 is a left side view of the motorcycle according to the embodiment. FIG. 2 is a left side view of the motorcycle according to the embodiment, in which an external member is detached from a vehicle body frame. In the following drawings, an arrow FR indicates a front direction of a vehicle body, an arrow RE indicates a rear direction of the vehicle body, an arrow L indicates a left side of the vehicle body, and an arrow R indicates a right side of the vehicle body.

As illustrated in FIGS. 1 and 2, a motorcycle 1 includes a vehicle body frame 2 of a twin spar type made of steel or aluminum alloy, onto which each part of an electric parts system is mounted, and various covers mounted onto the vehicle body frame as an external member of the vehicle body. A tank rail 3 of the vehicle body frame 2 extends rearward from a head frame 4 positioned at a front end portion thereof, and is branched into right and left directions. A front portion of an engine 5 is suspended on the head frame 4 and the tank rail 3. A pair of right and left body frames (pivot support portion) 6 extend downward from a rear end portion of the tank rail 3. A rear portion of the engine 5 is suspended on the body frames 6.

An air cleaner 51 for filtering air in the atmosphere is disposed in the pair of right and left tank rails 3. A fuel tank 52 is disposed on the tank rails 3 to cover the air cleaner 51, and fuel is stored in the fuel tank 52. A seat 11 is provided behind the fuel tank 52. The seat 11 is supported by a seat rail 13 extending rearward and upward from the body frames 6.

A steering shaft 81 is inserted into a head pipe 41 of the head frame 4, and steering bridges 82 and 83 are fixed to upper and lower end portions of the steering shaft 81. A pair of right and left front forks (front-wheel suspension portion) 8 are attached to the steering bridges 82 and 83, and thus are supported by the head pipe portion 41 to perform a steering operation. A front cushion for a front wheel buffer is built in the front forks 8, and a front wheel 85 is rotatably supported by lower portions of the front forks 8. An upper side of the front wheel 85 is covered by a front fender 86 attached to the front forks 8. A handle bar 87 is installed to the upper steering bridge 82, and grips 88 are mounted to both ends of the handle bar 87.

Swing arms 7 are connected to the body frames 6 of the vehicle body frame 2 in such a way that the swing arms can swing in an upward and downward direction, and a rear cushion unit 71 for a rear wheel buffer is attached between the vehicle body frame 2 and the swing arms 7. A rear wheel 75 is rotatably supported by rear portions of the swing arms 7. A driven sprocket (not illustrated) is installed to a left side of the rear wheel 75, and a drive force is transferred to the rear wheel 75 from the engine 5 by a drive chain (not illustrated). An upper side of the rear wheel 75 is covered by a rear fender 76 disposed at a rear portion of the seat 11. Further, pannier cases 15 can be installed to right and left sides of the seat 11.

The engine 5 consists of, for example, a V-type 2-cylinder engine and a transmission, and is suspended on the tank rails 3 and the body frames 6 so that the cylinders are arranged in a front and rear direction. Exhaust gas after combustion within a combustion chamber is exhausted from a muffler 54 via an exhaust pipe 53 extending downward from the engine 5.

Figure 3:
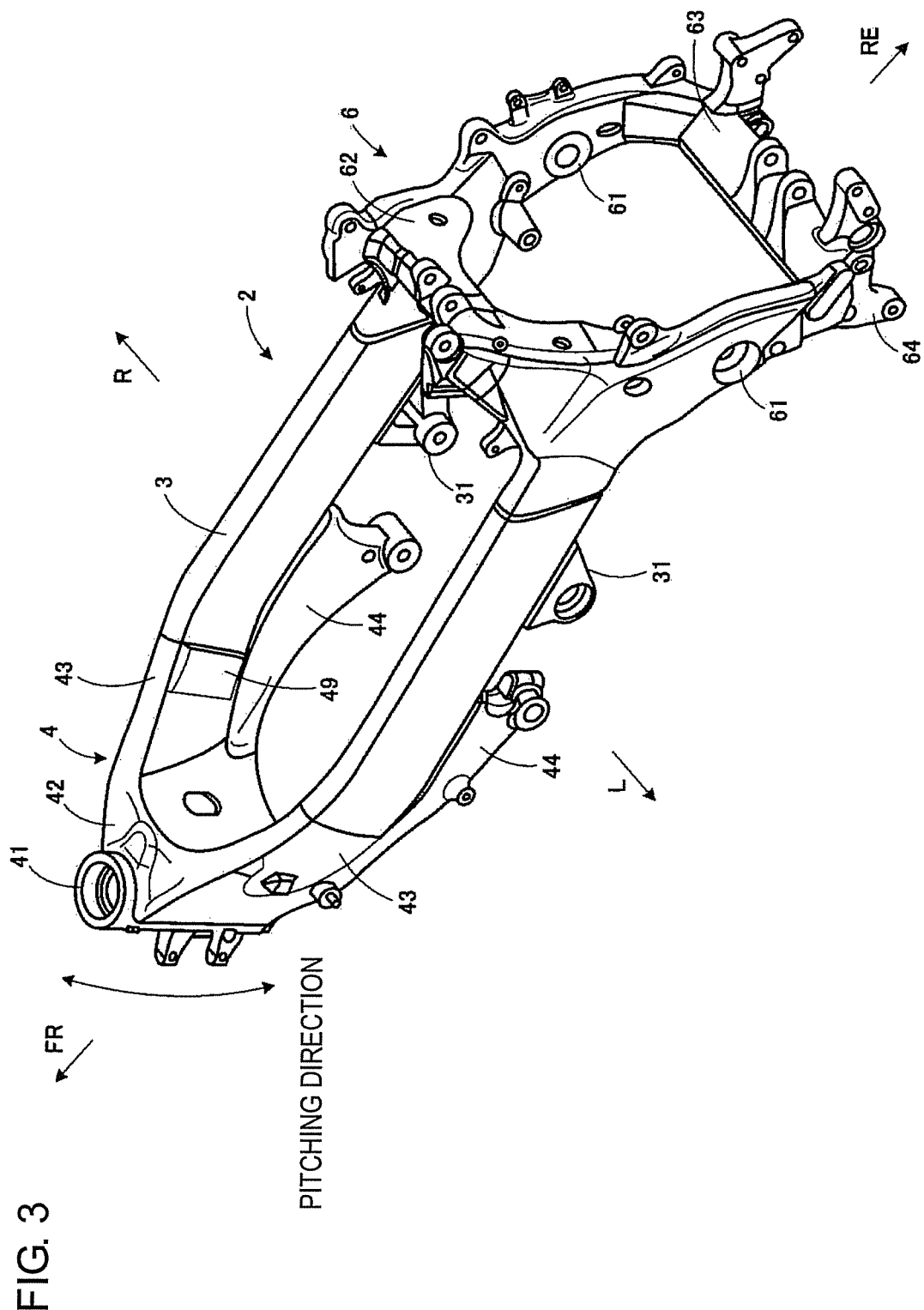
FIG. 3 is a perspective view of the vehicle body frame according to the embodiment.
Figure 4:
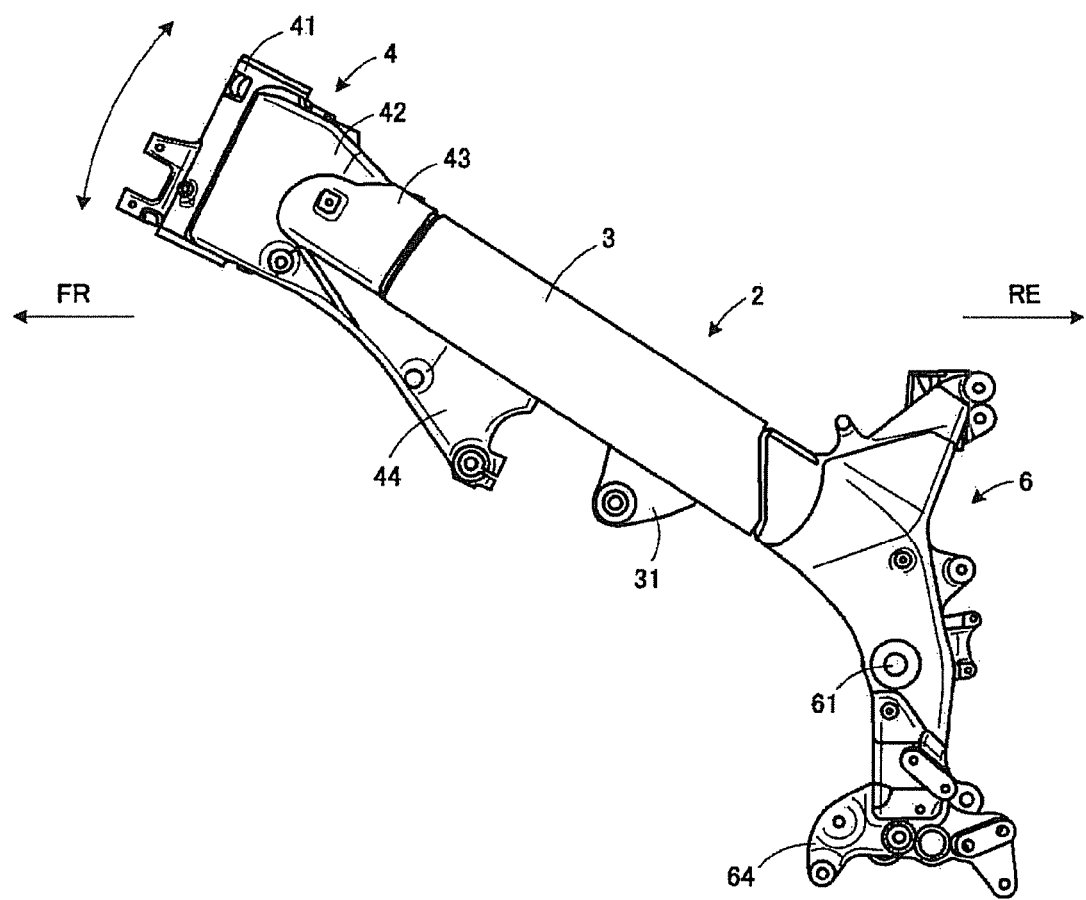
FIG. 4 is a side view of the vehicle body frame according to the embodiment.
Figure 5:
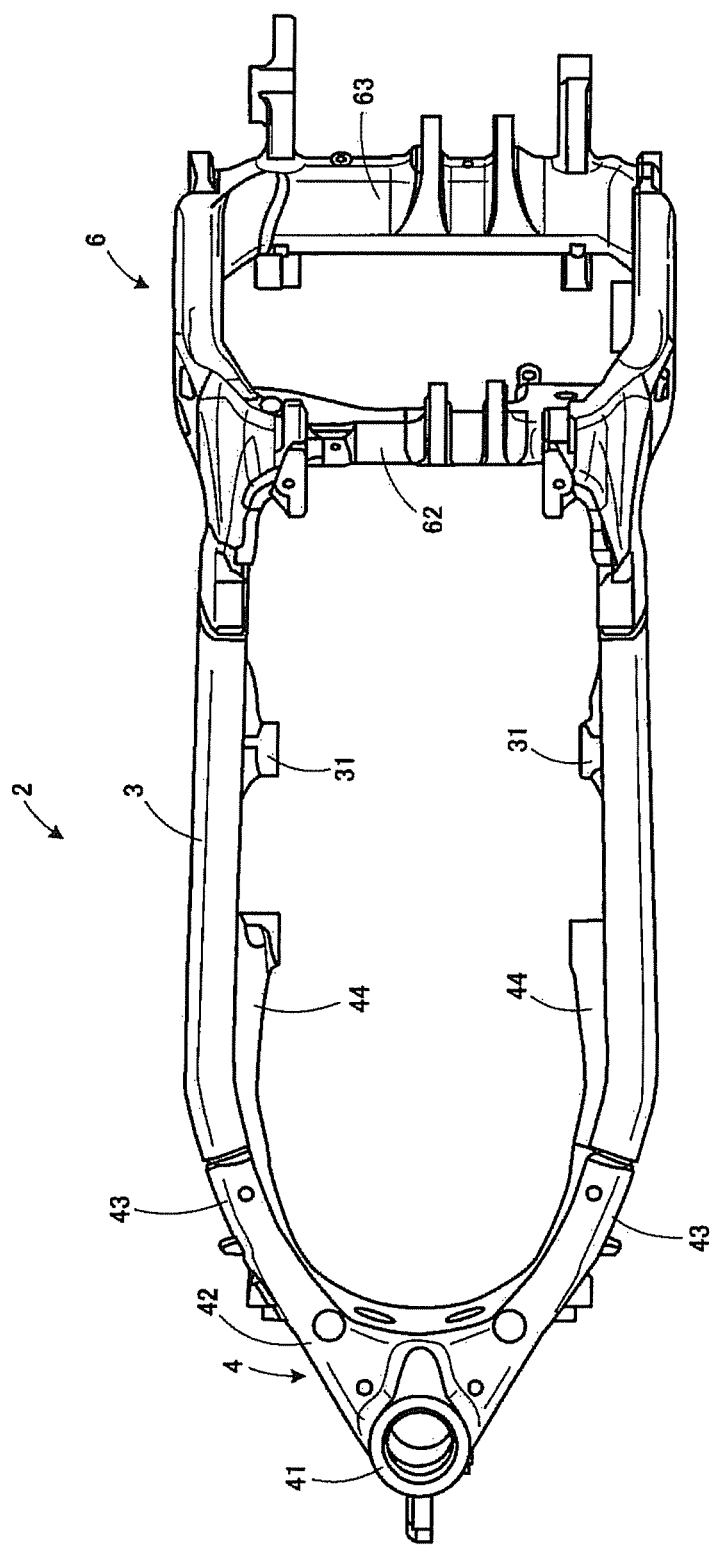
FIG. 5 is a top plan view of the vehicle body frame according to the embodiment.

The vehicle body frame according to this embodiment will be described with reference to FIGS. 3 to 5. FIG. 3 is a perspective view of the vehicle body frame according to this embodiment. FIG. 4 is a side view of the vehicle body frame according to this embodiment. FIG. 5 is a top plan view of the vehicle body frame according to this embodiment.

As illustrated in FIGS. 3 to 5, the vehicle body frame 2 includes the head frame 4, the pair of right and left tank rails 3 extending rearward of the vehicle body and downward at an angle from the head frame 4, and the pair of right and left body frames 6 extending downward from the rear end portion of each tank rail 3. The head frame 4 supports the pair of right and left front forks 8 at the head pipe portion 41 by the steering shaft 81 to perform the steering operation (see FIG. 2). Further, the head frame 4 has an middle portion 42 widened rearward in a right and left direction from the head pipe portion 41, and a pair of arm portions 43 extending rearward from the middle portion 42.

The pair of arm portions 43 are made from an aluminum-based material for casting in a hollow shape. An upper surface of each arm portion 43 is formed into a convex surface having an arc-shaped cross section. A lower portion of each arm portion 43 is provided with an engine suspension bracket 44 for supporting the front side of the engine 5 at the lower portions of the tank rails 3. The front end portions of the pair of tank rails 3 are welded to the rear end portions of the pair of arm portions 43.

The pair of tank rails 3 are made from an aluminum-based expanded material or the lie in a hollow shape. An upper surface of each tank rail 3 is formed into a convex surface having an arc-shaped cross section, similar to the arm portions 43. Each tank rail 3 extends rearward from the arm portion 43 to pass by the engine 5. The rear portion of the tank rail 3 is provided with an engine suspension bracket 31 for supporting the front side of the engine 5. The rear end portions of the pair of tank rails 3 are welded to the pair of body frames 6.

The pair of body frames 6 extend downward from the rear end portions of the tank rails 3, and are provided with swing arm pivots 61 for pivotally supporting the swing arms 7 at its middle portions in an extending direction. The pair of body frames 6 are connected to each other by an upper bridge 62 at its upper side, and are connected each other by a lower bridge 63 at its lower side. An upper end portion of the rear cushion unit 71 is maintained by the upper bridge 62, and a lower end portion f the rear cushion unit 71 is maintained by the lower bridge 63 via a link mechanism 72 (see FIG. 2). Each body frame 6 is provided with an engine suspension bracket 64 for supporting the rear side of the engine 5.

An accommodation space for the engine or the like is formed by the constituent members of the vehicle body frame 2. The engine 5 is suspended by the head frame 4, the tank rails 3, and the engine suspension brackets 44, 31 and 64 provided to the body frames 6, and thus serves as a reinforcing member for the vehicle body frame 2.

In the vehicle body frame 2 configured as described above, a bending load acts on the welded portion between the arm portions 43 of the head frame 4 and the tank rails 3 in a pitching direction. In particular, stress concentration is easily produced on an upper surface side of the welded portion between the arm portions 43 and the tank rails 3. Further, when base materials are generally welded, it is not possible to weld them beyond a portion of a high curvature, such as a corner portion. For example, in the case where the arm portions 43 and the tank rails 3 which are the base materials are formed in the rectangular tube shape, an end portion of a weld bead having low welding strength may be positioned on its upper surface on which the stress concentration is likely to produce.

In this embodiment, the arm portions 43 and the tank rails 3 are bent so that its upper surfaces are formed into the convex surfaces having the arc-shaped cross section, thereby forming smooth curved surfaces from the upper surfaces to the side surfaces. Accordingly, the weld bead is gently extended from the upper surface to the side surface to locate the end portion of the weld bead at the side surface, at which the stress is hardly to concentrate, so that a load in the welded portion is suppressed. Hereinafter, the welded portion between the head frame 4 and the tank rails 3 will be described in detail.

FIGS. 6A to 6E are views illustrating the welded portion between the head frame and the tank rails according to this embodiment. FIG. 6A is a plan view of a portion near the welded portion. FIG. 6B is a cross-sectional view taken along the line A-A in FIG. 6A. FIG. 6C is a cross-sectional view taken along the line B-B in FIG. 6A. FIG. 6D is a cross-sectional view taken along the line C-C in FIG. 6A. FIG. 6E is a cross-sectional view taken along the line D-D in FIG. 6D. For the purpose of illustration, the welded portion is indicated by a broken line.

As illustrated in FIGS. 6A and 6B, the front end portions 35 of the tank rails 3 are welded to the rear end portions 45 of the arm portions 43. The arm portion 43 has a hollow cross section extending in a vertical direction. The rear end portion of the arm portion 43 is formed to be sharp at its end so that it is narrowed toward its end face. The upper surface 46 of the arm portion 43 is formed in the arc shape to be convex in the upward direction when seen in a cross sectional view. The outer surface 47 of the arm portion 43 is curved to be convex in the outward direction when seen in a cross sectional view, so that it is gently continuous with the upper surface 46. An inner surface 48 of the arm portion 43 extends in a perpendicular direction when seen in a cross sectional view, so that it is gently continuous with the upper surface 46. That is, the arm portion 43 is formed in a substantially inverted U-shape when seen in a cross sectional view.

The tank rail 3 has the hollow cross section extending in the vertical direction. The front end portion 35 of the tank rail 3 is opened to receive the rear end portion 45 of the arm portion 43. An upper surface 36 of the tank rail 3 is formed in the arc shape to be convex in the upward direction when seen in a cross sectional view, so that it is gently continuous with the upper surface 36. An inner surface 38 of the tank rail 3 extends in a perpendicular direction when seen in a cross sectional view, so that it is gently continuous with the upper surface 36. That is, the tank rail 3 is formed in a substantially inverted U-shape when seen in a cross sectional view, similar to the arm portion 43.

The rear end portion 45 of the arm portion 43 is inserted into the opening of the front end portion 35 of the tank rail 3, so that the arm portion 43 is fitted into the tank rail 3. In this instance, a gap is formed between the front end portion 35 of the tank rail 3 and the rear end portion 45 of the arm portion 43, and a groove shape for butt welding is formed (see FIG. 6D). The groove shape for the butt welding crosses over the upper surfaces 46 and 36 from the outer surfaces 47 and 37 at the joint portion between the tank rails 3 and the arm portion 43, and extends to a portion of the upper sides of the inner surfaces 48 and 38. As illustrated in the range R1 of FIG. 6B, the tank rails 3 and the arm portions 43 are jointed to each other from the outer surfaces 47 and 37 to a portion of the upper side of the inner surfaces 48 and 38 along the groove shape by the butt welding.

As illustrated in FIGS. 6A and 6C, the inner surface 48 of the arm portion 43 is provided with a convex portion 49 protruding inwardly from the vehicle body. The convex portion 49 forms a stepped portion between the inner surface 48 of the arm portion 43 and the inner surface 38 of the tank rail 3, except for a portion of the upper side of the inner surface 48. Further, as illustrated in FIG. 6E, the convex portion 49 has an abutting surface 92 which abuts against the front end portion 35 of the tank rail 3. As the front end portion 35 of the tank rail 3 abuts against the abutting surface 92 of the arm portion 43, the tank rails 3 and the arm portions 43 are easily positioned when they are welded. The groove shape for fillet welding is formed by the abutting surface 92 of the arm portion 43 and the inner surface 38 of the tank rail 3.

The groove shape for the fillet welding is formed to be continuous with the groove shape for the butt welding at the joint portion between the tank rail 3 and the arm portion 43. As illustrated in the range R2 of FIG. 6B, the arm portion 43 and the tank rail 3 are jointed to each other downward from a portion of the upper sides of the inner surfaces 48 and 38 along the groove shape by the fillet welding. In such a way, the groove shape for the butt welding and the groove shape for the fillet welding are formed to be continuous with each other. Accordingly, since the end portion of the weld bead 94 for the butt welding and the end portion of the weld bead 95 for the fillet welding can be close to each other, it is possible to suppress the load applied to the end portions of the weld beads 94 and 95.

Further, the arm portion 43 is formed in the substantially inverted U-shape, and is formed into the smooth curved surface toward the outer surface 47 and the inner surface 48 from the upper surface 46. For this reason, contrary to the case where the arm portion 43 is formed in the rectangular pipe, the butt welding crossing over the upper surface 46 from the outer surface 47 can extend to a portion of the upper side of the inner surface 48. The end portion of the weld bead 94 for the butt welding is not positioned at the upper surface 46, on which the stress is likely to concentrate, but is positioned at the inner surface 48, on which the stress is hardly to concentrate, thereby suppressing the load in the welded portion.

Figure 7A:
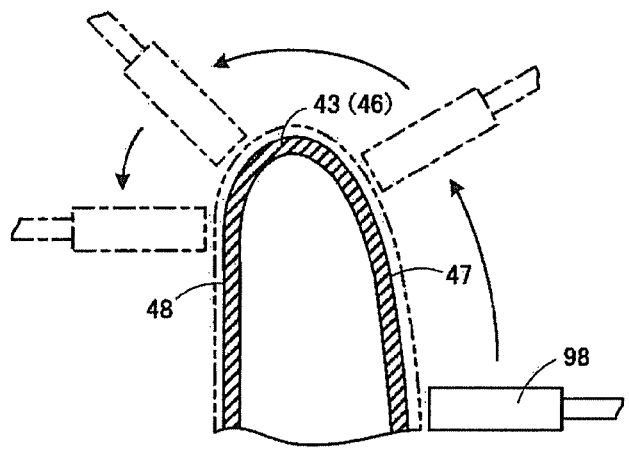
FIGS. 7A to 7C are explanatory views of a method for welding the head frame and the tank rails according to the embodiment, where
Figure 7B:
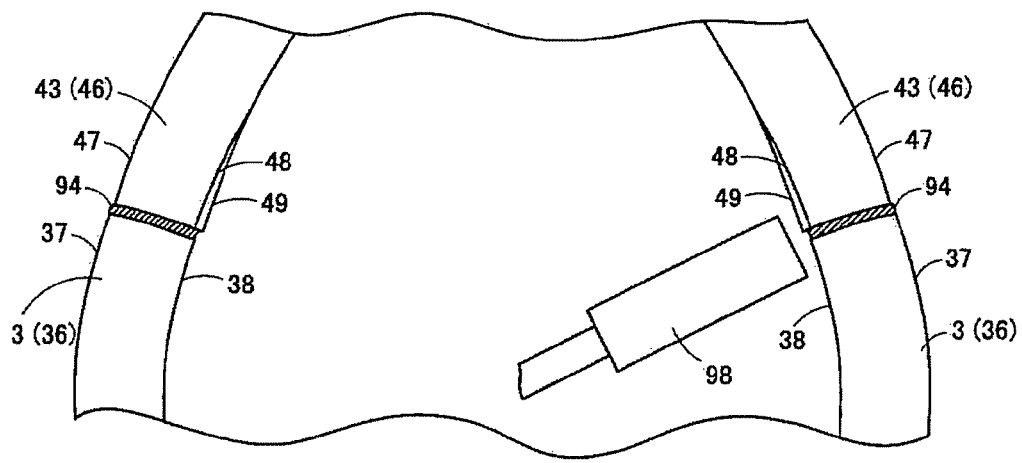
Figure 7C:
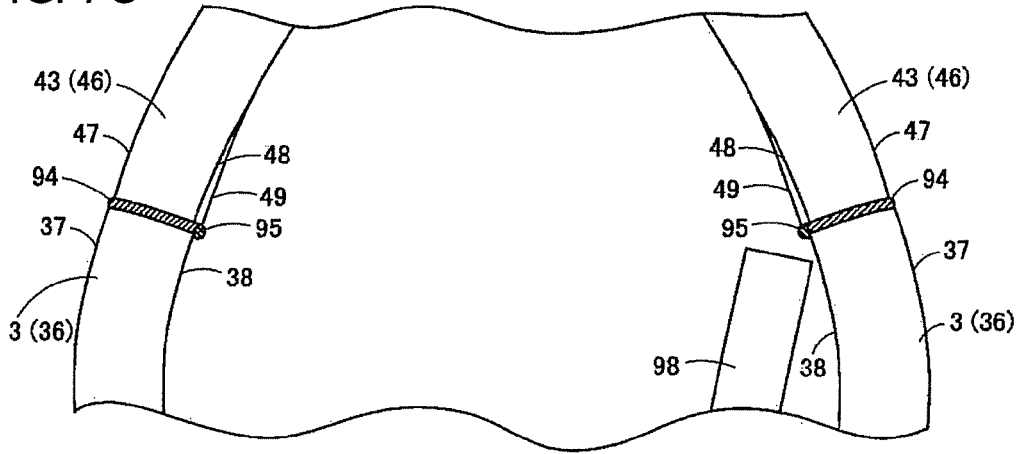

The method of welding the arm portions of the head frame and the tank rails will now be described with reference to FIGS. 7A to 7C. FIGS. 7A to 7C are explanatory views of the method for welding the head frame and the tank rails according to this embodiment. FIG. 7A is an explanatory view of the butt welding when seen in a cross sectional view, and, for the purpose of illustration, the tank rail is indicated by an imaginary line. FIG. 7B is an explanatory view of the butt welding when seen in a plan view. FIG. 7C is an explanatory view of the fillet welding when seen in a plan view. In this instance, FIGS. 7A to 7C show an example of the method of welding the arm portion and the tank rail, and the present invention is not limited thereto. For example, a welding direction or a welding order of the butt welding and the fillet welding may be changed.

As illustrated in FIG. 7A, the butt welding is performed in the state in which the arm portion 43 is fitted into the tank rails 3. For the butt welding, a welding torch 98 moves along the gentle curved surface extending from the outer surface 47 of the arm portion 43 to the upper surface 46, and the welding torch 98 moves along the gentle curved surface extending from the upper surface 46 to the inner surface 48. In this instance, since the outer surface of the arm portion 43 has no portion, for example, a corner portion, of which a curvature is abruptly changed, it is possible to continuously move the welding torch 98, without stopping it. The upper surface 46 of the arm portion 43 is preferably formed to have the substantially equal curvature radius so that the welding torch 98 moves with a margin.

As illustrated in FIG. 7B, for the butt welding, it is necessary to move the welding torch 98 in a state in which it is maintained vertically with respect to the inner surface 48. In a case where a gap between the pair of right and left tank rails 3 is narrow, such as a single-cylinder engine or a V-type two-cylinder engine, the welding torch 98 is hard to enter between the tank rails 3. For this reason, for the butt welding, if the welding is performed from the upper surface 46, the welding operation of the welding torch 98 is stopped. The weld bead 94 is formed from the outer surface 47 of the arm portion 43 to a portion of the upper side of the inner surface 48 across the upper surface 46 by the butt welding, the end portion of the weld bead 94 is positioned at the inner surface 48 on which the stress is hard to concentrate.

Next, as illustrated in FIG. 7C, the fillet welding is followed by the butt welding. During the fillet welding, the stepped portion between the abutting surface 92 (see FIG. 6E) of the convex portion 49 protruding from the inner surface 48 of the arm portion 43 and the inner surface 38 of the tank rail 3 is welded. Since a nozzle of the welding torch 98 faces the stepped portion, the welding can be performed in an attitude of obliquely inclining the welding torch 98. Accordingly, in the case where the gap between the pair of right and left tank rails 3 is narrow, the welding torch 98 can easily enter between the tank rails 3, thereby improving a degree of freedom of the welding. For the fillet welding, the welding torch 98 moves downward along the inner surface 48 of the arm portion 43 to be continuous with the end portion of the weld bead 94 of the butt welding.

According to the tank rails 3 and the arm portions 43 which are welded to each other by the above manner, the end portion (trailing end portion) of the weld bead 94 of the butt welding is positioned at the inner surface 48. In addition, the end portion (leading end portion) of the weld bead 95 of the fillet welding is adjacent to the end portion (trailing end portion) of the weld bead 94 of the butt welding. The end portion of the weld bead 94 having the low welding strength is disposed so as to avoid the upper surface 46 on which the stress is likely to concentrate, and the end portions of the weld beads 94 and 95 of the butt welding and the fillet welding are close to each other, thereby suppressing the stress from concentrating on the weld end portions.

With the frame structure according to this embodiment, the joint portion between the head frame 4 and the tank rails 3 is formed into the smooth curved surface from the upper surface 46 of the arm portion 43 to the inner surface 48. For this reason, the welding crossing the upper surface 46 of the arm portion 43 can extend to the inner surface 48, and thus the end portion of the weld bead 94 is positioned at the inner surface 48. Accordingly, the end portion of the weld bead 94 is not positioned at the upper surface 46, on which the stress is likely to concentrate, but is positioned at the inner surface 48, on which the stress is hardly to concentrate, thereby suppressing the load in the welded portion. In addition, as compared with the configuration in which the corner portion exists between the upper surface 46 and the inner surface 48, the welding torch 98 moves with a margin, without abruptly changing the angle of the welding torch, so that the welding operation can be easily performed.

The present invention is not limited to the above-described embodiments, and may be embodied in various modified forms. In the above-described embodiments, the sizes and shapes illustrated in the accompanying drawings are not intended to restrict the scope of the present invention, and may be modified appropriately as far as the effect of the present invention can be exerted. And, other modification may be also added appropriately without departing from the scope of the present invention.

For example, in the above-described embodiment, the upper surfaces 46 and 36 of the arm portions 43 and the tank rails 3 are formed into the convex surface having the arc-shaped cross section, but the present invention is not limited thereto. At least one of the upper surfaces 46 of the arm portions 43 and the upper surfaces 36 of the tank rails 3 may be formed into the convex surface having the arc-shaped cross section.

Also, in the above-described embodiment, the rear end portion 45 of the arm portion 43 is configured to be inserted into and welded to the front end portions 35 of the tank rails 3, but the present invention is not limited thereto. The front end portions 35 of the tank rails 3 may be configured to be inserted into and welded to the rear end portion 45 of the arm portion 43.

In addition, in the above-described embodiment, it has been illustrated and described the case where the gap between the pair of right and left tank rails 3 is narrow, such as a single-cylinder engine or a V-type two-cylinder engine, but the present invention is not limited thereto. The frame structure of the present invention can be applied to the vehicle body frame 2 in which the gap between the pair of right and left tank rails 3 is wide.

Further, in the above-described embodiment, the joint portion between the arm portions 43 and the tank rails 3 are jointed to each other by combination of the butt welding and the fillet welding, but the present invention is not limited thereto. In a case where the gap between a pair of right and left tank rails 3 is sufficiently wide, the arm portions 43 and the tank rails 3 may be jointed to each other by the butt welding only. If the fillet welding is not performed, the arm portion 43 may not be provided with the convex portion 49.

Furthermore, in the above-described embodiment, the welding is performed so that the end portion of the weld bead 94 for the butt welding is continuous with the end portion of the weld bead 95 for the fillet welding, but the present invention is not limited thereto. The end portion (trailing end portion) of the weld bead 94 for the butt welding may be disposed to be apart from the end portion (leading end portion) of the weld bead 95 for the fillet welding within a range to obtain the joint strength.

Furthermore, in the above-described embodiment, the head frame 4 includes the head pipe portion 41, the middle portion 42, and the pair of arm portions 43, but the present invention is not limited thereto. The head frame 4 may be configured so that the pair of arm portions 43 extends rearward while being widened in the right and left direction from the head pipe portion 41, without installing the middle portion 42.

Still furthermore, in the above-described embodiment, the arm portions 43 and the tank rails 3 are formed so that the outer surfaces 47 and 37 are formed in the curved shape and the inner surfaces 48 and 38 are formed in the straight shape, but the present invention is not limited thereto. The cross-sectional shape of the outer surfaces 47 and 37 and the inner surfaces 48 and 38 are not especially limited. For example, the outer surfaces 47 and 37 may be formed in the straight shape, and the inner surfaces 48 and 38 may be formed in the curved shape.

Still furthermore, in the above-described embodiment, the arm portions 43 and the tank rails 3 are welded to each other by the butt welding and the fillet welding, but the present invention is not limited thereto. The arm portions 43 and the tank rails 3 are preferably jointed to each other by the welding. For example, any one of the arm portions 43 and the tank rails 3 is preferably provided with a slit groove, and then be jointed to each other by slot welding.

As described above, the present invention has an effect of suppressing the load in the welded portions between the head frame and the tank rails, and, more particularly, is useful for a frame structure of an aluminum twin spar frame.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A frame structure for a saddle-ridden type vehicle, the frame structure comprising:

a head frame positioned at a front portion of a vehicle body; and a pair of right and left tank rails jointed to the head frame, the pair of right and left tank rails extending rearward of the vehicle body from the head frame, wherein the head frame includes a head pipe portion supporting a front-wheel suspension portion, and a pair of right and left arm portions being continuous with the head pipe portion and extending rearward of the vehicle body, wherein each of upper surfaces of at least one of rear end portions of the pair of right and left arm portions and front end portions of the pair of right and left tank rails are formed into a convex surface having an arc-shaped cross section, and wherein the rear end portions of the pair of right and left arm portions and the front end portions of the pair of right and left tank rails are respectively welded to each other so that end portions of weld beads are positioned at side surfaces thereof.

2. The frame structure for the saddle-ridden type vehicle according to claim 1, wherein inner surfaces of the pair of right and left arm portions are provided with convex portions to form stepped portions at joint portions between the rear end portions of the pair of right and left arm portions and the front end portions of the pair of right and left tank rails, and wherein the convex portions of the pair of right and left arm portions and the rear end portions of the pair of right and left arm portions are respectively welded to each other by fillet welding.

3. The frame structure for the saddle-ridden type vehicle according to claim 2, wherein the rear end portions of the pair of right and left arm portions and the front end portions of the pair of right and left tank rails are respectively welded to each other by butt welding so that the end portions of the weld beads are positioned at the inner surfaces, and are respectively welded so as to be continuous with the end portions of the weld beads by the fillet welding.

* * * * *